United States Patent
Hartmann

(10) Patent No.: US 6,375,847 B1
(45) Date of Patent: Apr. 23, 2002

(54) METHOD FOR OPERATING A CROSS-FLOW FILTRATION INSTALLATION

(75) Inventor: Eduard Hartmann, Schneisingen (CH)

(73) Assignee: Bucher-Guyer AG, Niederweningen/Zurich (CH)

( * ) Notice: Subject to any disclaimer, the term of this patent is extended or adjusted under 35 U.S.C. 154(b) by 0 days.

(21) Appl. No.: 09/254,045

(22) PCT Filed: Jun. 19, 1998

(86) PCT No.: PCT/CH98/00266

§ 371 Date: Mar. 1, 1999

§ 102(e) Date: Mar. 1, 1999

(87) PCT Pub. No.: WO99/02245

PCT Pub. Date: Jan. 21, 1999

(30) Foreign Application Priority Data

Jul. 8, 1997 (CH) .............................. 1656/97

(51) Int. Cl.⁷ .......................... B01D 61/22; B01D 61/14
(52) U.S. Cl. ................. 210/650; 210/637; 210/87; 210/106; 210/195.2; 417/26; 417/44.11; 417/313
(58) Field of Search .................. 210/87, 637, 321.65, 210/106, 739, 741, 416.1, 195.2, 196, 650; 417/44.11, 44.1, 45, 26, 313; 324/664

(56) References Cited

U.S. PATENT DOCUMENTS

| | | | |
|---|---|---|---|
| 4,366,061 A | * | 12/1982 | Papanek et al. |
| 4,772,385 A | | 9/1988 | Yamada et al. ............... 210/87 |
| 4,936,997 A | * | 6/1990 | Taniguchi et al. |
| 5,004,535 A | * | 4/1991 | Bosko et al. |
| 5,685,987 A | * | 11/1997 | Hixon, Jr. et al. |
| 5,800,173 A | * | 9/1998 | Hartmann |
| 5,958,243 A | | 9/1999 | Lawrence et al. |

FOREIGN PATENT DOCUMENTS

| | | |
|---|---|---|
| JP | 63-270592 | 2/1989 |
| JP | 01-011610 | 4/1989 |
| JP | 04-078426 | 6/1992 |
| JP | 06-114372 | 7/1994 |
| JP | 07-284637 | 2/1995 |

* cited by examiner

Primary Examiner—Ana Fortuna
Assistant Examiner—Richard W. Ward
(74) Attorney, Agent, or Firm—Burns, Doane, Swecker & Mathis, L.L.P.

(57) ABSTRACT

The method relates to the operation of a cross-flow filtration installation for a product. This installation includes a filtration module (6), a pipeline (3) for the inflow of the product, a pipeline (9) for removing the product, a pump (4) with an electric motor (12) for recirculating the product, and a control valve (5') for setting the conveying flow (Q1) of the pump (4). In order to make possible the maximally possible filtration output, based on the installation, along with a high proportion of solids of the product, without endangering operational safety by means of overloads, the strength of the operating current (i1) of the electric motor (12) is measured. The operating current (i1) is adjusted to a maximally, permissible value via a regulator (20) by setting the conveying flow (Q1) of the pump (4) by adjusting the flow control valve (5').

15 Claims, 5 Drawing Sheets

METHOD FOR OPERATING A CROSS-FLOW FILTRATION INSTALLATION

Figure 1A:
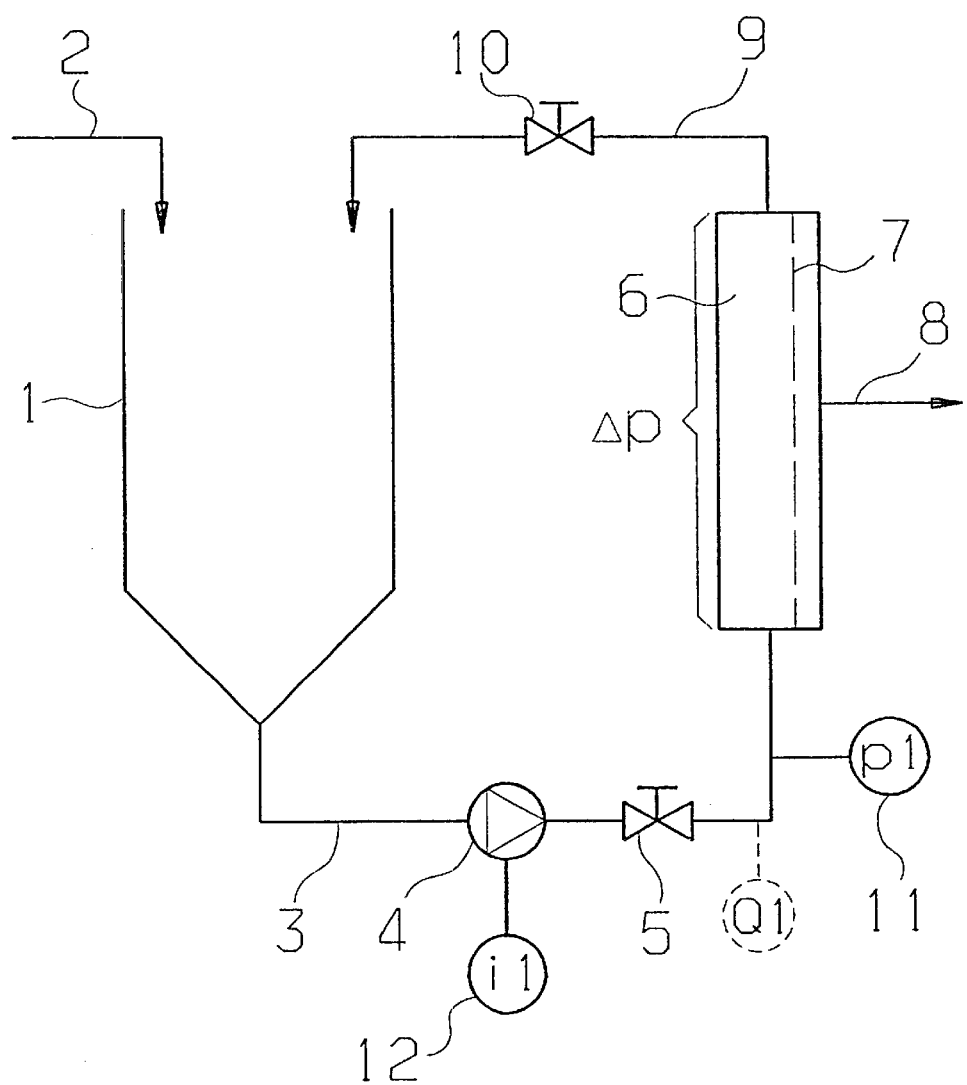

The invention relates to a method for operating a cross-flow filtration installation for a product, comprising at least one filtration module with product flow-through and permeate outflow, a pipeline for supplying the product to and removing it from the filtration module, a pump with an electric motor in the pipeline for supplying the product to the filtration module, as well as a device for setting the conveying flow of the pump. The invention also relates to a cross-flow filtration installation for executing this method.

Known cross-flow filtration installations operate in the operating modes of ultra-filtration, micro-filtration, nano-filtration and reverse osmosis. For all operating modes at least one pump is required for transporting a product to be filtered past the surface of filtration diaphragms. In the process a static pressure and a flow speed of the product occur at every filtration diaphragm, which cause a portion of the product to penetrate the filtration diaphragms as permeate.

A known optimization goal for such installations is a large filtration yield as a permeate quantity in liters per diaphragm surface in square meters and filtration time in hours. It is a further goal to achieve a high maximum degree of thickening of the remaining portion of the product as the retentate. The degree of thickening is determined in a centrifuge test as a portion of the wet sludge in percent of the retentate amount. Besides many other operating parameters, these goals are a direct function of the mentioned parameters of static pressure and flow speed of the product.

The mentioned optimization goals can only be achieved in a limited way, because in the operation of ultra-filtration, for example, known filtration diaphragms on an organic basis have a low permissible operating pressure of approximately 6 bar. Thus, in view of the filtration yield and the concentration of solids, there is the goal of always fully utilizing at least the preset permissible operating pressure. If therefore it is possible with a predetermined diaphragm size and predetermined product throughput per hour to operate at maximum permissible operating pressure, maximum concentration of the solids and viscosity of the retentate are simultaneously achieved.

In connection with diafiltration, high concentrations of solids at the end of the filtration also result in advantages during the subsequent washing out of the retentate. The amount of time and washing agent (water) depends heavily on this concentration of solids.

The desired operation at maximally permissible operating pressure and high solids concentration in the retentate now leads to problems, in particular when using non-volumetrically conveying pumps for the product. The relationship between the amount conveyed and the conveying pressure of such pumps changes with changes in the retentate properties. The influences of the following properties have an effect here:

- the viscosity of the retentate,
- the specific mass of the retentate, and
- the intrinsically viscous or thixotropic behavior of the retentate.

If it is attempted to maintain the maximally permissible operating pressure at the diaphragm constant by regulating the filtration, large fluctuations of the product yield in liters per hour occur. If it is attempted to control these fluctuations in the yield at the pump, changes of the specific mass of the product in particular lead to changes of the power consumption of the drive motor of the pump in kilowatts and therefore to overloads with emergency stops of the delivery and therefore of the installation. Because of the intrinsically viscous behavior, such interruptions of the delivery at high solids concentration of the retentate, however, have the result that the installation then can no longer be restarted. Often, damage to the filtration modules occurs, and the jammed-up product can only be removed by manual cleaning and with a large expenditure of time.

In connection with known large and small installations, the mentioned circumstances either result in that the maximally possible filtration yield cannot be utilized, or that the required outlay for monitoring and regulating the installation becomes very large.

The invention is therefore based on the object of making possible the maximally possible filtration yield, based on the installation, along with a large proportion of solids of the product, without endangering the safety of the operation because of overloads.

In accordance with the invention, this object is attained in connection with a method of the type mentioned at the outset in that the strength of the operating current of the electric motor is measured and, by setting the conveying flow of the pump by means of the adjustment device, is set to at least one predetermined value.

Preferably the method is executed in such a way that the predetermined value of the operating current of the electric motor is a maximally permissible nominal value of the current consumption. In the process, the value of the operating current of the electric motor as the regulating variable is adjusted by means of a regulator to the nominal value through a comparison with the preselected value as the nominal value via the device for setting the conveying flow of the pump as the control system in a control loop.

A flow control valve, which is connected downstream of the pump in the inflow conduit for the product, or a device for setting the frequency of the operating current, and therefore the pump rpm, associated with the current supply of the electric motor, are used as the device for setting the conveying flow of the pump. It is possible in this case to additionally control the inflow pressure into the filtration module by means of a flow control device in the module outlet for the retentate.

Further variations of the method, as well as of a cross-flow filtration installation for executing it, are characterized in the claims.

In comparison with known installations, the method in accordance with the invention also offers the additional advantage in connection with required module cleaning outside of the filtration operation that, because of the safely possible maximum product flow-through, improved cleaning of the modules by means of the flow-through method is possible.

Figure 1B:
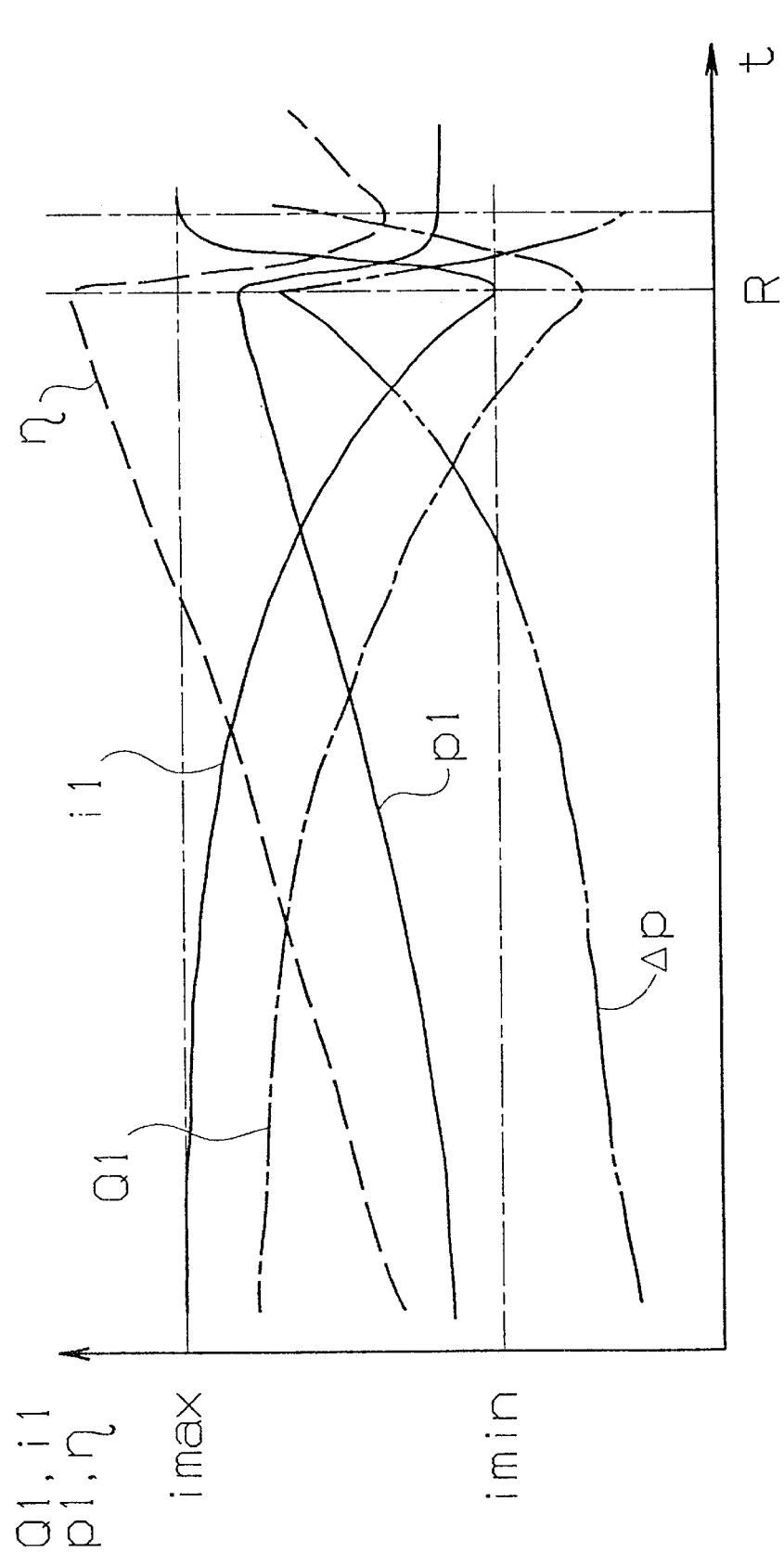
Figure 1C:
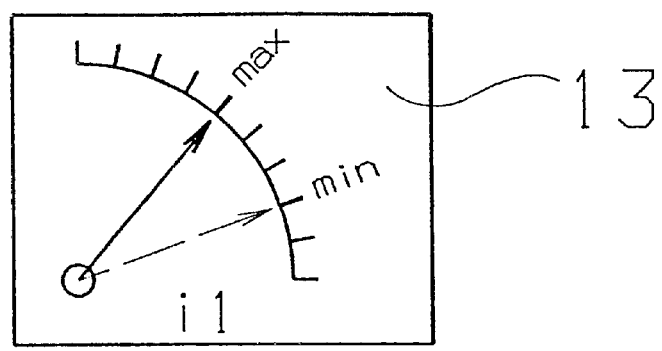
Figure 2C:
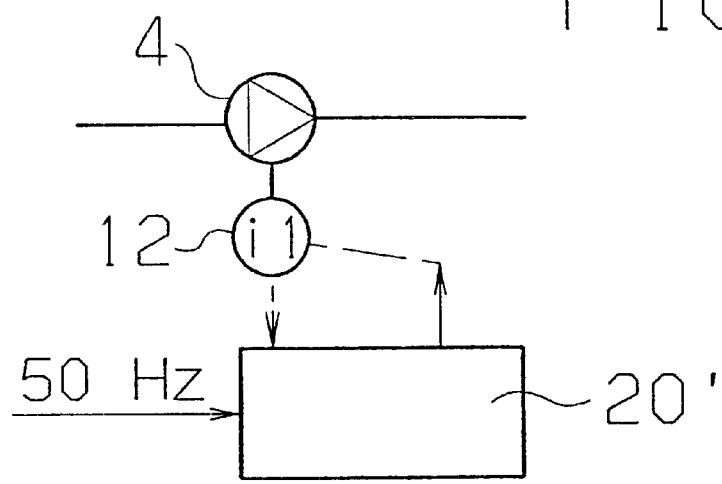
Figure 2A:
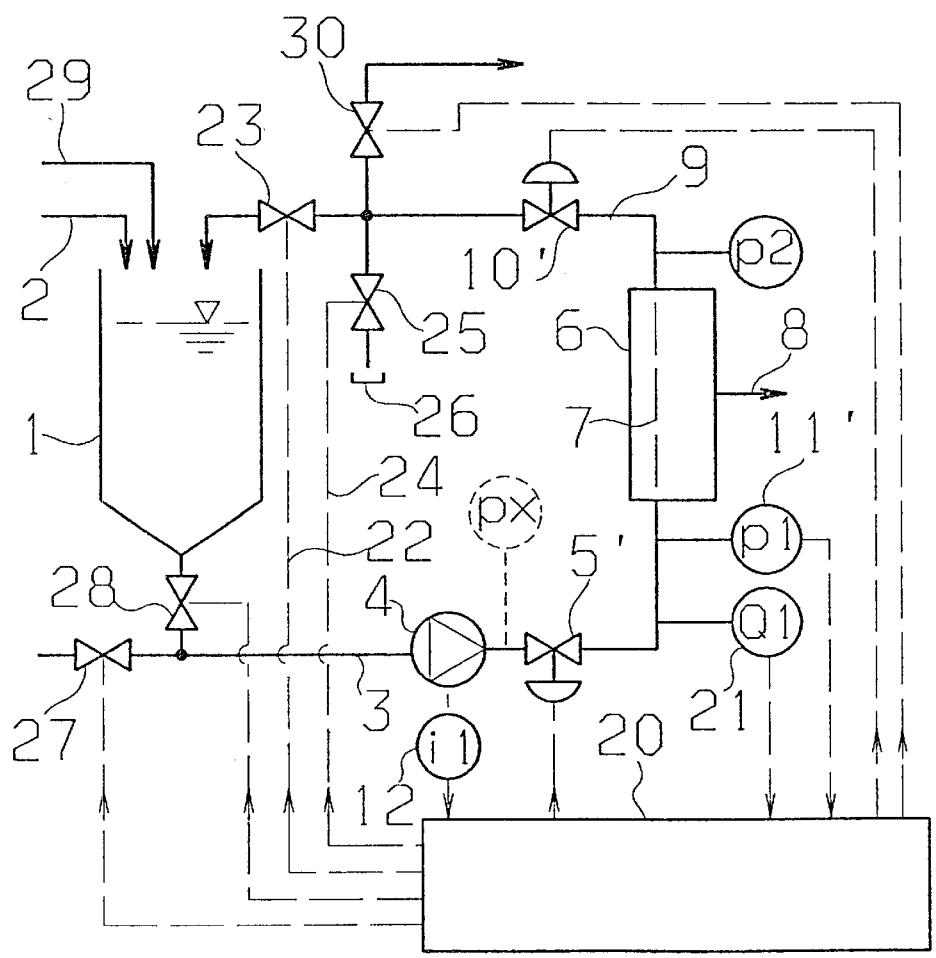
Figure 2B:
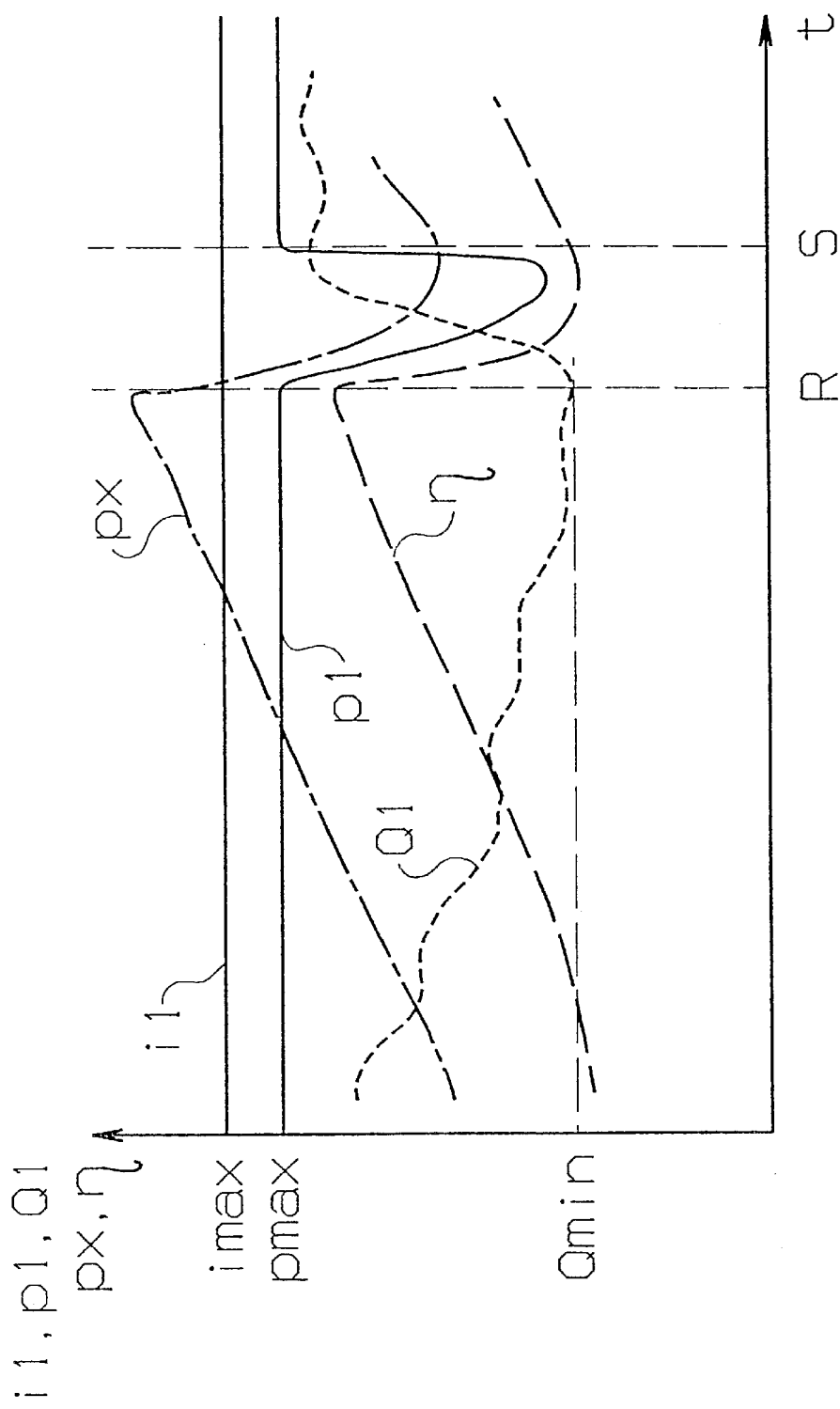

Exemplary embodiments of the invention have been explained in greater detail in the following description and in the figures of the drawings. Shown are in:

FIG. 1a, a diagram of a small installation with cross-flow filtration for executing the method in accordance with the invention, FIG. 1b, the progressions of various operational values in the course of a filtration by means of the small installation in FIG. 1a, FIG. 1c, a graduated dial for an operator of a small installation in FIG. 1a, FIG. 2a, a diagram of a large installation with cross-flow filtration for executing the method in accordance with the invention, FIG. 2b, the progressions of various operational values in the course of a filtration by means of the large installation in FIG. 2a, FIG. 2c, a diagram of an rpm regulation in a large installation in FIG. 2a.

In accordance with FIG. 1a, a simple cross-flow filtration installation includes a container 1 for receiving an amount of raw fruit juice to be filtered, which is supplied as the raw product via a conduit 2. The juice is conveyed by a pump 4 via a valve 5 to a filtration module 6 known per se through a conduit 3 connected to the bottom of the container 1. Filtration modules of this type include a multitude of tube-shaped filtration diaphragms, along which the product to be filtered is passed on the outside or mostly the inside. These diaphragms are symbolized by a single diaphragm 7 in FIG. 1a.

In the course of its passage, a portion of the product penetrates openings in the diaphragms 7 and reaches the other side of the diaphragms 7, from where it is removed as the permeate or filtrate by means of a collection conduit 8. The remaining portion of the product is returned as the retentate via a valve 10 through a conduit 9 to the container 1. Because of a pressure difference (also called trans-diaphragm pressure) generated by the * pump 4 in combination with the flow resistance of the filtration module 6 and of the valve 10, the permeate penetrates the diaphragms 7. With modules 6 of a known type, the trans-diaphragm pressure is limited to a maximum permissible value of typically 6 bar. Since in the collection conduit 8 in accordance with FIG. 1a the permeate is under ambient pressure, it is possible to monitor the trans-diaphragm pressure p1 by a pressure gauge 11 provided at the input to the module 6.

The pump 4 is driven by an electric motor 12, which has a graduated dial 13 for monitoring the operating current i1 of the type represented in FIG. 1c.

During the operation of the small installation in accordance with FIG. 1a, the valve 5 is closed at the beginning, and the valve 10 is partially opened. Then the pump 4 is started. The electrical current consumed by the electric motor 12 in the process can be read off the graduated dial 13, FIG. 1c. Now the valve 5 is completely opened and thereafter the valve 10 is opened until a permissible current imax in accordance with the graduation on the graduated dial 13 has been reached. The pump 4 of this small installation is dimensioned in such a way that the trans-diaphragm pressure p1 generated at the beginning as well as during a subsequent increase because of the thickening of the retentate does not exceed a permissible maximum value for the module 6. FIG. 1b represents the progressions of the current i1 and the pressure p1 over the time t. With this, the starting phase of this small installation is ended.

With an increasing filtration time t, the pressure drop $\Delta p$ over the filtration module 6 increases because of the thickening of the retentate. Because of the pump characteristic of the pump 4, the inflow pressure p1 at the module 6 then increases and the current consumption i1 of the motor 12 decreases, as shown in FIG. 1b. When the current consumption i1 has reached a minimum value imin, as indicated by the graduated dial 13, a minimum product flow-through Q1 at the inlet of the module 6, corresponding to a maximally permissible wet sludge portion of the retentate, has been reached, as shown in FIG. 1b. The appearance of imin constitutes an alarm signal, when this signal occurs is initiated, either manually or automatically. Rinse water is introduced into the system to displace and thin the concentrated retentate portion removing in the retentate circulation loop 1, 3, 4, 5, 6, 9, and 10. The time of the start of the re-thinning is indicated in FIG. 1b by R on the t-axis, the progression of the viscosity of the retentate by $\eta$.

In the diagram of a large installation with cross-flow filtration in accordance with FIG. 2a, reference numerals already described in connection with FIG. 1a refer to components with corresponding functions. However, in contrast to FIG. 1a, a regulating and control unit 20 is provided in FIG. 2a, which compares the operating current i1 of the electric motor 12 for the pump 4 for then circulation of the product as a regulating variable with a nominal value imax and regulates i1 to imax. To this end, the regulating unit 20 generates an adjustment signal, which is supplied to a control valve 5' as the control system for the product flow Q1 generated by the pump 4. Furthermore, a pressure gauge 11' at the input of the filtration module 6 generates a signal p1, which corresponds to the inflow pressure prevailing there, and by means of which a control valve 10' in the retentate outflow conduit 9 of the module 6 is adjusted via the regulating unit 20 in such a way that p1 remains constant at the maximally permissible trans-diaphragm pressure pmax.

In the course of operating the large installation in accordance with FIG. 2a, the control valve 5' is closed at the beginning, and the control valve 10' is completely open. Then the pump 4 is started against the closed control valve 5'. Subsequently the control loop 12, 20, 5' opens the control valve 5' and regulates the drive current ii of the electric motor 12 for the pump 4 so that it is constant at the maximally permissible value imax, as represented in FIG. 2b. In the same manner, with the control loop 11', 20, 10', the module 6 is regulated to a constant inflow pressure pmax by the control valve 10', as also represented in FIG. 2b. FIG. 2b also shows how the viscosity $\eta$ of the retentate increases in the course of the operating time t. The result of this is that the pressure px at the outlet of the pump 4 also increases up to the time of re-thinning R, while the product flow Q1 decreases. Thereafter a cleaning process by rinsing starts at the time S.

As with the small installation in accordance with FIG. 1a, with the large installation in accordance with FIG. 2a the start R of re-thinning must also be initiated when a minimum product flow- through Q1, corresponding to a maximally permissible wet sludge portion of retentate, has been reached at the inlet of the module 6. In accordance with FIG. 2a, a flow-through sensor 21 is provided for this, whose output signal is supplied to the regulating unit 20. When the product flow-through Q1 has reached the minimum value Qmin, the regulating unit 20 interrupts the retentate circuit by diverting the retentate via a control line 22 and a slide valve 23, as well as a control line 24 and a slide valve 25, from the container 1 to a rinsing tank 26.

Water is used for re-thinning and rinsing, which is supplied to the conduit 3 via a slide 27, which has been opened by the regulating unit 20 for this purpose, while the inflow from the container 1 is closed by means of a slide 28. If the container 1 is also to be rinsed, the slide 27 is closed, the slide 28 opened and the water is conducted to the container 1 via a conduit 29.

In the control loop 4, 12, 20, 5' for the current i1 of the electric motor 12, the control valve 5' with the regulator 20 for its adjustable variable can be replaced by a regulator 20' for the frequency of the drive current of the motor 12 and therefore the rpm of the pump 4, as represented in FIG. 2c. In this case, too, the current strength i1 is measured as the regulating variable in the regulator 20', however, as the adjustable variable, i1 is changed by the frequency instead of by the product flow Q1 in accordance with FIG. 2a. The embodiment in accordance with FIG. 2c prevents unnecessary energy losses in the valve 5' in accordance with FIG. 2a, but also prevents mechanical problems of the movable elements of the valve 5'.

In accordance with the schematic representations of FIG. 1a and 2a, the container 1 as a batch tank receives the amount of raw juice to be filtered at the start of each filtration process, thereafter the supply of raw juice is interrupted.

However, in accordance with FIG. 2a the option is provided that retentate is continuously removed via a slide 30 from the conduit 9 for returning the retentate. The slide 30 can be opened and closed by the regulating unit 20. Thus, with the slide 30 open, a continuous operation of the filtration installation with a continuous supply of raw juice and continuous removal of permeate is possible. In this case, rinsing of the installation becomes necessary, because the permeate flow in the conduit 8 will decrease due to clogging of the diaphragms 7 of the module 6.

A multitude of uses of the method is offered to one skilled in the art in connection with juices, waste water, water desalination, etc., as well as with means for controlling or regulating the operating current of the electric motor 12 for the pump 4, all of which do not depart from the scope of the attached claims.

What is claimed is:

1. A method for performing a product filtration process within a cross-flow installation comprising: a filtration section having at least one cross-flow filtration module, a product inlet, a product outlet and a permeate outlet; a pump having an electric motor for feeding product to said filtration section; a regulator; and a flow control valve; said method comprising:

feeding product to said filtration section using said electric motor to drive said pump;

measuring the strength of the operating current of the electric motor;

using said regulator to compare the measured operating current strength of the electric motor with a nominal value to generate an adjustment signal; and adjusting said flow control valve in response to said adjustment signal to bring the measured value of the operating current strength to said nominal value.

2. The method in accordance with claim 1 wherein said adjustable valve is disposed downstream of the pump and upstream of said at least one cross-flow filtration module to adjust the flow of product from the pump.

3. The method of claim 1, wherein said nominal value is a preselected maximally permissible operating current value.

4. The method of claim 1, including displacing said product from said installation when thickening of said product has caused the product flow rate across said filtration module to drop below a preselected minimally permissible flow rate.

5. The method of claim 4, wherein said product is displaced by a rinsing agent.

6. A method for performing a product filtration process within a cross-flow filtration installation comprising: a filtration section having at least one module, a product inlet, a product outlet and a permeate outlet; a pump having an electric motor supplied with a drive current to operate the motor for feeding product to said filtration module; and a regulator for the frequency of the drive current of said motor; said method comprising:

feeding product to said filtration section using said electric motor to drive said pump; and using said regulator for
        measuring the strength of the operating current of the electric motor,
        comparing the measured operating current strength of the electric motor with a nominal value to generate an adjustment signal, and
        adjusting the frequency of the operating current of said electric motor in response to said adjustment signal to bring the measured value of the operating current strength to said nominal value.

7. The method of claim 6, wherein said nominal value is a preselected maximally permissible operating current value.

8. The method of claim 7, wherein said filtration installation additionally includes a control valve in the flow path of the product being filtered at a location downstream of said filtration section, and wherein said method additionally comprises adjusting said control valve during the filtration process to provide a substantially constant pressure at said product inlet.

9. The method of claim 6, including displacing said product from said installation when thickening of said product has caused the product flow rate across said filtration module to drop below a preselected minimally permissible flow rate.

10. The method of claim 9, wherein said product is displaced by a rinsing agent.

11. A method for performing a product filtration cycle in a cross-flow filtration installation having a container for product to filtered, at least one cross-flow filtration module for separating permeate from product flowing therethrough, a product re-circulating loop for the flow of product from said container through said at least one filtration module and back to said container, a pump with an electric motor for moving the product through said loop, and an adjustable valve for changing the resistance offered to flow of the product through said loop; said method comprising:

starting said cycle by supplying current to said electric motor, measuring the strength of the operating current of said motor, and adjusting said valve to set the flow of said pump so that the measured value of the strength of the operating current of said motor reaches a predetermined maximally permissible value;

continuing said cycle without further adjustment of said valve and while monitoring the measured strength of the operating current of said motor; and ending said cycle when-thickening of the product has reduced the flow rate of the product through said loop to a minimally permissible value corresponding to a measured value of the strength of the operating current below said maximally permissible value.

12. The method of claim 11, wherein said cycle is ended by displacing the product from said installation by a rinsing agent.

13. The method of claim 11, wherein the ending of said cycle is initiated manually by an operator.

14. A method for performing a product filtration cycle in a cross-flow filtration installation having a container for product to filtered, at least one cross-flow filtration module for separating permeate from product flowing therethrough, a product re-circulating loop for the flow of product from said container through said at least one filtration module and back to said container, a pump with an electric motor for moving the product through said loop, and a regulator for adjusting the frequency of the operating current of said electric motor to adjust the motor speed for setting the conveying flow of the pump, said method comprising:

starting said cycle by supplying current to said electric motor, measuring the strength of the operating current of said motor, and adjusting said regulator to set the flow of said pump so that the measured value of the strength of the operating current of said motor reaches a predetermined maximally permissible value;

continuing said cycle while maintaining the strength of the operating current of said motor at said predetermined maximally permissible value;

measuring the product flow produced by said pump; and ending said cycle when the value of the product flow produced by said pump drops to a predetermined value.

15. In a method for operating a cross-flow filtration installation including a cross-flow filtration module having a product inlet, a product outlet and a permeate outlet; a pump having an electric motor for feeding product to said filtration module; a regulator; and a flow control valve; the improvement which comprises:

measuring the strength of the operating current of the electric motor;

comparing the measured operating current strength of the electric motor with a preselected maximally permissible value; and adjusting at least one of said flow control valve and said regulator to bring the measured value of the operating current strength to a preselected maximally permissible value.

* * * * *